No. 750,843. Patented February 2, 1904.

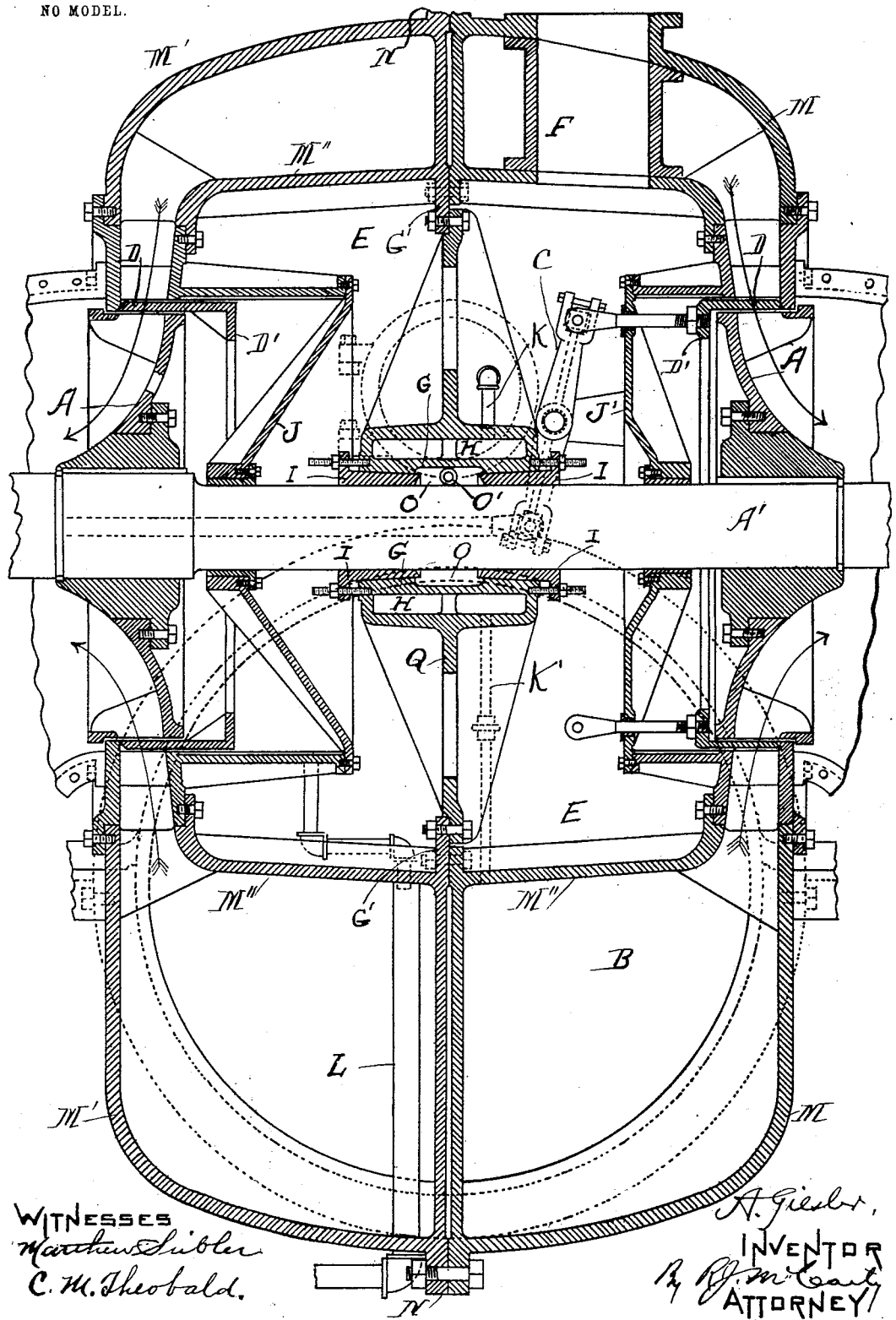

UNITED STATES PATENT OFFICE.

ARTHUR GIESLER, OF DAYTON, OHIO, ASSIGNOR TO THE STILWELL-BIERCE & SMITH-VAILE CO., OF DAYTON, OHIO, A CORPORATION OF NEW JERSEY.

WATER-WHEEL SETTING.

SPECIFICATION forming part of Letters Patent No. 750,843, dated February 2, 1904.

Application filed April 7, 1902. Serial No. 101,724. (No model.)

*To all whom it may concern:*

Be it known that I, ARTHUR GIESLER, a citizen of the United States, residing at Dayton, in the county of Montgomery and State of Ohio, have invented certain new and useful Improvements in Water-Wheel Settings; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in water-wheel settings, and has specific reference to improvements in the bearings for the water-wheel shaft.

The object of the invention is to provide lubricated bearings for said shaft which are protected from the water by being provided with a separate chamber from which water is excluded, the said chamber being arranged as shown in the accompanying drawing.

In the modern application of water-wheel settings a more rapid rate of speed is required for the wheel-shaft in the generation of electricity and for other modern purposes. This more rapid rotation of the water-wheel shaft requires more perfect bearings than is obtainable in the case of wooden bearings, which have heretofore been employed. In order to obtain this desired perfection in the bearings of the water-wheel shaft, it is necessary to construct the boxes or bearings of metal—such, for example, as Babbitt metal—and to provide oil or grease as a lubricating agency. It is well known that such bearings cannot successfully operate in places where water might have access thereto. It therefore becomes necessary to provide means for protecting such bearings from water, which is accomplished by means of the present invention, which will now be described.

The drawing is a sectional elevation of a pair of water-wheels mounted upon a shaft extending through a flume under pressure, the bearing of said shaft being placed within a special chamber from which water is excluded.

In a detail description of the invention similar reference characters indicate corresponding parts.

A A are a pair of turbine-wheels mounted upon a horizontal shaft A'.

B is a scroll-casing under water-pressure and consisting of two parts M M', united by means of exterior flanges N, said casing being also united to chute-cases D. Within the scroll-casing is an inclosed bearing-chamber E, the casing of which consists of two parts M'', united by interior flanges G' and made integral with the scroll-casing. The flanges G' are also attached to a vertical bridge-tree Q, having a hub through which the turbine-shaft passes and providing an oil-chamber O from which said shaft is lubricated, the chamber O being fed by a pipe O'.

H is a water-chamber in said hub in which a water circulation is maintained through pipes K and K'.

F is a manhole projecting through the scroll-chamber from above and communicating with the chamber E.

J and J' are covers which seal the opposite sides of the chamber and exclude water from entering the chamber at these points.

I I designate two taper sleeves projected into the hub on either side of the oil-chamber.

C designates certain old and well-known features—to wit, levers through which the wheel-gates D' are operated to admit water to the turbine A.

L is a drain-pipe extending from the bearing-chamber E into the tail-water, and thus having an air-tight seal at its lower end.

I claim as my invention—

In a turbine-wheel, the combination with chute-cases, of a scroll-casing consisting of two parts connected with said chutes, a two-part casing on the interior of said scroll-casing and rigidly united thereto, said interior casing providing an inclosed bearing-chamber, a bridge-tree attached to said interior casing and providing a bearing for the turbine-shaft within said inclosed chamber, substantially as set forth.

In testimony whereof I affix my signature in presence of two witnesses.

ARTHUR GIESLER.

Witnesses:
R. J. McCarty,
C. M. Theobald.